United States Patent [19]
Limberg

[11] Patent Number: 6,023,306
[45] Date of Patent: Feb. 8, 2000

[54] NTSC INTERFERENCE DETECTORS USING COMB FILTERS THAT SUPPRESS DIGITAL TV PILOT CARRIER FOR NTSC EXTRACTION

[75] Inventor: Allen LeRoy Limberg, Vienna, Va.

[73] Assignee: Samsung Electronics Co. Ltd., Suwon, Rep. of Korea

[21] Appl. No.: 09/016,338

[22] Filed: Jan. 30, 1998

Related U.S. Application Data

[63] Continuation-in-part of application No. 08/724,800, Oct. 2, 1996.

[51] Int. Cl.[7] .................................................. H04N 5/38
[52] U.S. Cl. .............................. 348/726; 348/21; 348/607
[58] Field of Search .............................. 348/21, 470, 725, 348/726, 558, 555, 607; 325/346, 348, 350

[56] References Cited

U.S. PATENT DOCUMENTS

| | | | |
|---|---|---|---|
| 5,260,793 | 11/1993 | Citta et al. | 358/167 |
| 5,298,803 | 3/1994 | Limberg | 348/726 |
| 5,479,449 | 12/1995 | Patel et al. | 375/316 |
| 5,512,957 | 4/1996 | Hulyalkar | 348/607 |
| 5,546,132 | 8/1996 | Kim et al. | 348/607 |
| 5,594,496 | 1/1997 | Nielsen et al. | 348/21 |
| 5,602,602 | 2/1997 | Hulyalkar | 346/607 |
| 5,777,692 | 7/1998 | Ghosh | 348/725 |
| 5,793,417 | 8/1998 | Lee | 348/21 |
| 5,828,404 | 10/1998 | Krishamurthy | 348/21 |
| 5,835,131 | 11/1998 | Limberg | 348/21 |
| 5,852,476 | 12/1998 | Limberg | 348/725 |

*Primary Examiner*—Victor R. Kostak
*Attorney, Agent, or Firm*—Samsung Electronics Co, Ltd

[57] ABSTRACT

NTSC interference detectors include an NTSC extracting filter for supplying an NTSC extracting filter response that separates accompanying co-channel interfering NTSC signal component from the received I-channel baseband signal and its direct bias component. The NTSC extracting filter comprises a comb filter, which includes a delay circuit for supplying in response to said received I-channel baseband signal differentially delayed signals with a prescribed amount of differential delay equal to the duration of an even number of horizontal scanning periods of NTSC signal as will generate said co-channel interfering NTSC signal components. The comb filter further includes a subtractor for differentially combining the differentially delayed signals to generate the comb filter response.

18 Claims, 4 Drawing Sheets

NTSC INTERFERENCE DETECTORS USING COMB FILTERS THAT SUPPRESS DIGITAL TV PILOT CARRIER FOR NTSC EXTRACTION

This is a continuation-in-part of U.S. patent application Ser. No. 08/724,800 filed Oct. 2, 1996.

The present invention relates to digital television systems, and more particularly, to circuits employed in the digital television receiver for determining whether or not there is co-channel interference from NTSC analog television signals.

BACKGROUND OF THE INVENTION

A Digital Television Standard published 16 Sep. 1995 by the Advanced Television Subcommittee (ATSC) specifies vestigial sideband (VSB) signals for transmitting digital television (DTV) signals in 6-MHz-bandwidth television channels such as those currently used in over-the-air broadcasting of National Television Subcommittee (NTSC) analog television signals within the United States. The VSB DTV signal is designed so its spectrum is likely to interleave with the spectrum of a co-channel interfering NTSC analog TV signal. This is done by positioning the pilot carrier and the principal amplitude-modulation sideband frequencies of the DTV signal at odd multiples of one-quarter the horizontal scan line rate of the NTSC analog TV signal that fall between the even multiples of one-quarter the horizontal scan line rate of the NTSC analog TV signal, at which even multiples most of the energy of the luminance and chrominance components of a co-channel interfering NTSC analog TV signal will fall. The video carrier of an NTSC analog TV signal is offset 1.25 MHz from the lower limit frequency of the television channel. The carrier of the DTV signal is offset from such video carrier by 59.75 times the horizontal scan line rate of the NTSC analog TV signal, to place the carrier of the DTV signal about 309,877.6 kHz from the lower limit frequency of the television channel. Accordingly, the carrier of the DTV signal is about 2,690122.4 Hz from the middle frequency of the television channel. The exact symbol rate in the Digital Television Standard is (684/286) times the 4.5 MHz sound carrier offset from video carrier in an NTSC analog TV signal. The number of symbols per horizontal scan line in an NTSC analog TV signal is 684, and 286 is the factor by which horizontal scan line rate in an NTSC analog TV signal is multiplied to obtain the 4.5 MHz sound carrier offset from video carrier in an NTSC analog TV signal. The symbol rate is 10.762238 megasymbols per second, which can be contained in a VSB signal extending 5.381119 MHz from DTV signal carrier. That is, the VSB signal can be limited to a band extending 5.690997 MHz from the lower limit frequency of the television channel.

The ATSC standard for digital HDTV signal terrestrial broadcasting in the United States of America is capable of transmitting either of two high-definition television (HDTV) formats with 9:16 aspect ratio. One HDTV format uses 1920 samples per scan line and 1080 active horizontal scan lines per 30 Hz frame with 2:1 field interlace. The other HDTV format uses 1280 luminance samples per scan line and 720 progressively scanned scan lines of television image per 60 Hz frame. The ATSC standard also accommodates the transmission of DTV formats other than HDTV formats, such as the parallel transmission of four television signals having normal definition in comparison to an NTSC analog television signal.

DTV transmitted by vestigial-sideband (VSB) amplitude modulation (AM) during terrestrial broadcasting in the United States of America comprises a succession of consecutive-in-time data fields each containing 313 consecutive-in-time data segments. There are 832 symbols per data segment. So, with the symbol rate being 10.76 MHz, each data segment is of 77.3 microseconds duration. Each segment of data begins with a line synchronization code group of four symbols having successive values of +S, −S, −S and +S. The value +S is one level below the maximum positive data excursion, and the value −S is one level above the maximum negative data excursion. The initial line of each data field includes a field synchronization code group that codes a training signal for channel-equalization and multipath suppression procedures. The training signal is a 511-sample pseudo-noise sequence (or "PN-sequence") followed by three 63-sample PN sequences. The middle one of these 63-sample PN sequences is transmitted in accordance with a first logic convention in the first line of each odd-numbered data field and in accordance with a second logic convention in the first line of each even-numbered data field, the first and second logic conventions being one's complementary respective to each other.

The data within data lines are trellis coded using twelve interleaved trellis codes, each a 2/3 rate trellis code with one uncoded bit. The interleaved trellis codes are subjected to Reed-Solomon forward error-correction coding, which provides for correction of burst errors arising from noise sources such as a nearby unshielded automobile ignition system. The Reed-Solomon coding results are transmitted as 8-level (3 bits/symbol) one-dimensional-constellation symbol coding for over-the-air transmission, which transmissions are made without symbol precoding separate from the trellis coding procedure. The Reed-Solomon coding results are transmitted as 16-level (4 bits/symbol) one-dimensional-constellation symbol coding for cablecast, which transmissions are made without precoding. The VSB signals have their natural carrier wave, which would vary in amplitude depending on the percentage of modulation, suppressed.

The natural carrier wave is replaced by a pilot carrier wave of fixed amplitude, which amplitude corresponds to a prescribed percentage of modulation. This pilot carrier wave of fixed amplitude is generated by introducing a direct component shift into the modulating voltage applied to the balanced modulator generating the amplitude-modulation sidebands that are supplied to the filter supplying the VSB signal as its response. If the eight levels of 4-bit symbol coding have normalized values of −7, −5, −3, −1, +1, +3, +5 and +7 in the carrier modulating signal, the pilot carrier has a normalized vale of 1.25. The normalized value of +S is +5, and the normalized value of −S is −5.

The video carrier of an NTSC signal is 1.25 MHz from edge of the 6-MHz-wide broadcast channel, while the carrier for a digital TV signal for terrestrial through-the-air broadcast is 310 kHz from the lower edge of the 6-MHz-wide broadcast channel. A co-channel NTSC signal does not exhibit symmetrical amplitude-modulation sidebands with respect to the carrier of the vestigial-sideband amplitude-modulation (VSB AM) carrying digital information. Accordingly, the NTSC video carrier at 940 kHz remove from digital TV signal carrier and its sidebands at further remove from digital TV signal carrier are not well canceled in the digital TV signal. Nor, of course, is the NTSC audio carrier at 5.44 MHz remove from digital TV signal carrier.

In the earlier development of the DTV art it was contemplated that the DTV broadcaster might be called upon to decide whether or not to use a symbol precoder at the transmitter, which symbol precoder would follow the symbol generation circuitry and provide for matched filtering of symbols, when used together with a comb filter in each DTV receiver used before the data-slicer in the symbol decoder circuitry as a symbol post-coder. This decision would have depended upon whether interference from a co-channel NTSC broadcasting station were expected or not. Symbol precoding would not have been used for data line synchronization code groups or during data lines in which data field synchronization data were transmitted. Co-channel interference is reduced at greater distances from the NTSC broadcasting station(s) and is more likely to occur when certain ionospheric conditions obtain, the summertime months during years of high solar activity being notorious for likelihood of co-channel interference. Such interference will not obtain if there are no co-channel NTSC broadcasting stations, of course. If there were likelihood of NTSC interference within his area of broadcast coverage, it was presumed that the HDTV broadcaster would use the symbol precoder to facilitate the HDTV signal being more easily separated from NTSC interference; and, accordingly, a comb filter would be employed as symbol post-coder in the DTV receiver to complete matched filtering. If there were no possibility of NTSC interference or there were insubstantial likelihood thereof, in order that flat spectrum noise would be less likely to cause erroneous decisions as to symbol values in the trellis decoder, it was presumed that the DTV broadcaster would discontinue using the symbol precoder; and, accordingly, the symbol post-coder would then be disabled in each DTV receiver. The Digital Television Standard the ATSC published 16 Sep. 1995 does not allow for the use of precoding of all data at the DTV transmitter to compensate for post-coding incidental to subsequent use of comb filtering in a DTV signal receiver to reject NTSC co-channel interference. Instead, only the initial symbol in the trellis decoding is precoded. This procedure by itself does not facilitate a DTV signal receiver using comb filtering to reject NTSC co-channel interference before data slicing procedures are undertaken. A DTV signal receiver that does not reject NTSC co-channel interference before data slicing procedures are undertaken will not have good reception under strong NTSC co-channel interference conditions as may be caused by the DTV receiver being remote from the DTV transmitter or having an analog TV transmitter very closeby. In U.S. patent application Ser. No. 08/826,790 filed 24 Mar. 1997 and entitled "DTV RECEIVER WITH FILTER IN I-F CIRCUITRY TO SUPPRESS FM SOUND CARRIER OF NTSC CO-CHANNEL INTERFERING SIGNAL", the inventor points out that comb filtering procedures are not entirely satisfactory for suppressing the NTSC audio carrier, particularly under conditions of frequency modulation in which carrier frequency deviation is large, since correlation (or anti-correlation) of samples of the FM carrier at times separated by any substantial fixed delay is apt not to be particularly good. U.S. patent application Ser. No. 08/826,790 advocates that the filtering used to establish the overall bandwidth of intermediate-frequency amplification be such as to reject the FM audio carrier of any co-channel interfering NTSC analog TV signal. Comb filtering procedures are more satisfactory for suppressing the NTSC video carrier and nearby sidebands, which tend to exhibit good correlation between samples separated by certain specific delay intervals and to exhibit good anti-correlation between samples separated by other certain specific delay intervals. Suitable comb filtering procedures are also satisfactory for suppressing chroma sidebands near the NTSC chrominance subcarrier, which tend to exhibit good correlation between samples separated by certain specific delay intervals and to exhibit good anti-correlation between samples separated by other certain specific delay intervals.

In allowed U.S. patent application Ser. No. 08/746,520 filed by the inventor on 12 November 1996 and entitled "DIGITAL TELEVISION RECEIVER WITH ADAPTIVE FILTER CIRCUITRY FOR SUPPRESSING NTSC CO-CHANNEL INTERFERENCE", the inventor advocates preceding data-slicing in a DTV receiver with comb filtering to suppress NTSC co-channel interference when that interference is sufficiently large as to affect data-slicing adversely. The inventor teaches how to compensate in the symbol decoding procedure for the effects of such comb filtering upon symbol coding when it is selectively done. U.S. patent application Ser. No. 08/882,538 filed by the inventor on 25 June 1997 and entitled "SYMBOL DECODING APPARATUS WITH PLURAL DATA SLICERS AND AN ADAPTIVE NTSC CO-CHANNEL INTERFERENCE FILTER" provides further teaching in this regard. It is, then, still useful to be able to determine when NTSC co-channel interference is larger than a prescribed value denominated as being acceptably small, so that this determination can be used for controlling the selective use of comb filtering to suppress NTSC co-channel interference.

U.S. Pat. No. 5,260,793 issued 9 Nov. 1993 to R. W. Citta et alii and entitled "RECEIVER POST CODER SELECTION CIRCUIT" selectively employs a post-coder comb filter for suppressing NTSC interference accompanying a real or in-phase baseband component (I channel) of the complex output signal of a demodulator used in a digital high-definition television (HDTV) receiver. The presence of NTSC interference in the I-channel component of the demodulator response is detected for developing control signals automatically to enable or disable the comb filter being used for suppressing NTSC co-channel interference. During each data field sync interval, the input signal to and the output signal from an NTSC suppression filter of comb filter type in the HDTV receiver are each compared with a respective signal that is known a priori and is drawn from memory within the HDTV receiver. If the minimum result of comparison with the input signal has less energy than the minimum result of comparison with the output signal from the NTSC suppression filter, this is indicative that the primary cause of variance from expected reception is random noise rather than NTSC co-channel interference. Insofar as the particular digital television receiver is concerned, reception would be better were precoding and post-coding not employed in the system, and it is presumed that the broadcaster has not employed precoding. If the minimum result of comparison with the input signal has more energy than the minimum result of comparison with the output signal from the NTSC suppression filter, this is indicative that the primary cause of variance from expected reception is NTSC co-channel interference rather than random noise. Insofar as the particular digital television receiver is concerned, reception would be better were precoding and post-coding employed in the system, and it is presumed that the broadcaster has employed precoding.

(The problem with using precoding at the transmitter is that, while precoding may be preferable insofar as a particular DTV receiver is concerned, precoding may not be desirable for other DTV receivers receiving transmissions from the transmitter. A DTV receiver less remote from the transmitter or more remote from a co-channel analog TV transmitter may not suffer significant amounts of co-channel interference, for example.)

U.S. Pat. No. 5,546,132 issued 13 Aug. 1996 to K. S. Kim et alii and entitled "NTSC INTERFERENCE DETECTOR" describes attempts to detect co-channel NTSC interference from data within the data segments other than those transmitting data field sync information. A comb filter that subtractively combines differentially delayed symbol coding in the I-channel is used to suppress the co-channel NTSC interference; and the use of a comb filter that additively combines differentially delayed symbol coding in the I-channel is advocated for extracting co-channel NTSC interference, so that the energy of the co-channel NTSC interference within a data segment can be determined. The problem with this approach is that the comb filter Kim et alii propose to use for extracting co-channel NTSC interference also responds to symbol coding associated with the digital signal transmission and to the direct component associated with synchronous detection of pilot subcarrier. The energy associated with symbol coding is higher than the energy of co-channel NTSC interference that will cause significant error in data slicing. So is the energy in the direct component associated with synchronous detection of pilot subcarrier. Clearly, a better approach was needed for determining, from data within the data segments other than those transmitting data field sync information, whether there are significant amounts of co-channel NTSC interference.

U.S. patent application Ser. No. 08/724,80 filed by the inventor on 2 Oct. 1996, entitled "NTSC INTERFERENCE DETECTORS USING COMB FILTERS THAT SUPPRESS HDTV PILOT CARRIER FOR NTSC EXTRACTION", and incorporated herein by reference advocates using a comb filter that subtractively combines differentially delayed symbol coding in the I-channel for extracting co-channel NTSC interference, so the direct component associated with synchronous detection of pilot subcarrier does not appear in the comb filter response. This facilitates detecting the presence of co-channel NTSC interference, at least during the data segments transmitting data field sync information, when the energy associated with symbol coding can be predicted and taken into account when threshold detecting to determine whether or not there significant co-channel NTSC interference is present. U.S. patent application Ser. No. 08/724,80 presumed that the carrier for a digital TV signal for terrestrial through-the-air broadcast would be 675 kHz from the lower edge of the 6-MHz-wide broadcast channel, rather than 310 kHz from that edge as in the final standard. This alters the comb filtering required for extracting co-channel NTSC interference if the comb filtering employs differential delay longer than a few symbol periods, or epochs.

SUMMARY OF THE INVENTION

The invention is embodied in improvements for an NTSC interference detector incorporated within a digital high-definition television receiver including a demodulator for extracting a received I-channel baseband signal susceptible of being accompanied at times by respective co-channel interfering NTSC signal components. Generally, as known from the prior art, such an NTSC interference detector comprises an NTSC extracting filter for supplying an NTSC extracting filter response that separates accompanying co-channel interfering NTSC signal component from the received I-channel baseband signal and an accompanying direct bias signal; a comparing portion for periodically integrating the NTSC extracting filter response and deciding whether the co-channel interfering NTSC signal component separated from the received I-channel baseband signal is above a first reference value or not; and a control signal generator for accumulating the signal supplied from the comparing portion for each integration period, deciding the presence or absence of the co-channel interfering NTSC signal components according to a second reference value, and supplying a control signal according to the presence or absence of the co-channel interfering NTSC signal component in the received I-channel baseband signal. The aspects of the invention disclosed herein are characterized by a comb filter in the NTSC extracting filter including a delay circuit for supplying in response to said received I-channel baseband signal differentially delayed signals with a prescribed amount of differential delay equal to the duration of an even number of horizontal scanning periods of NTSC signal as will generate said co-channel interfering NTSC signal components and by that comb filter further including a subtractor for differentially combining the differentially delayed signals to generate the response of the comb filter. Preferably, the prescribed amount of differential delay is equal to the duration of an even number of horizontal scanning periods of NTSC signal

DETAILED DESCRIPTION OF THE PREFERRED EMBODIMENT

Figure 1:
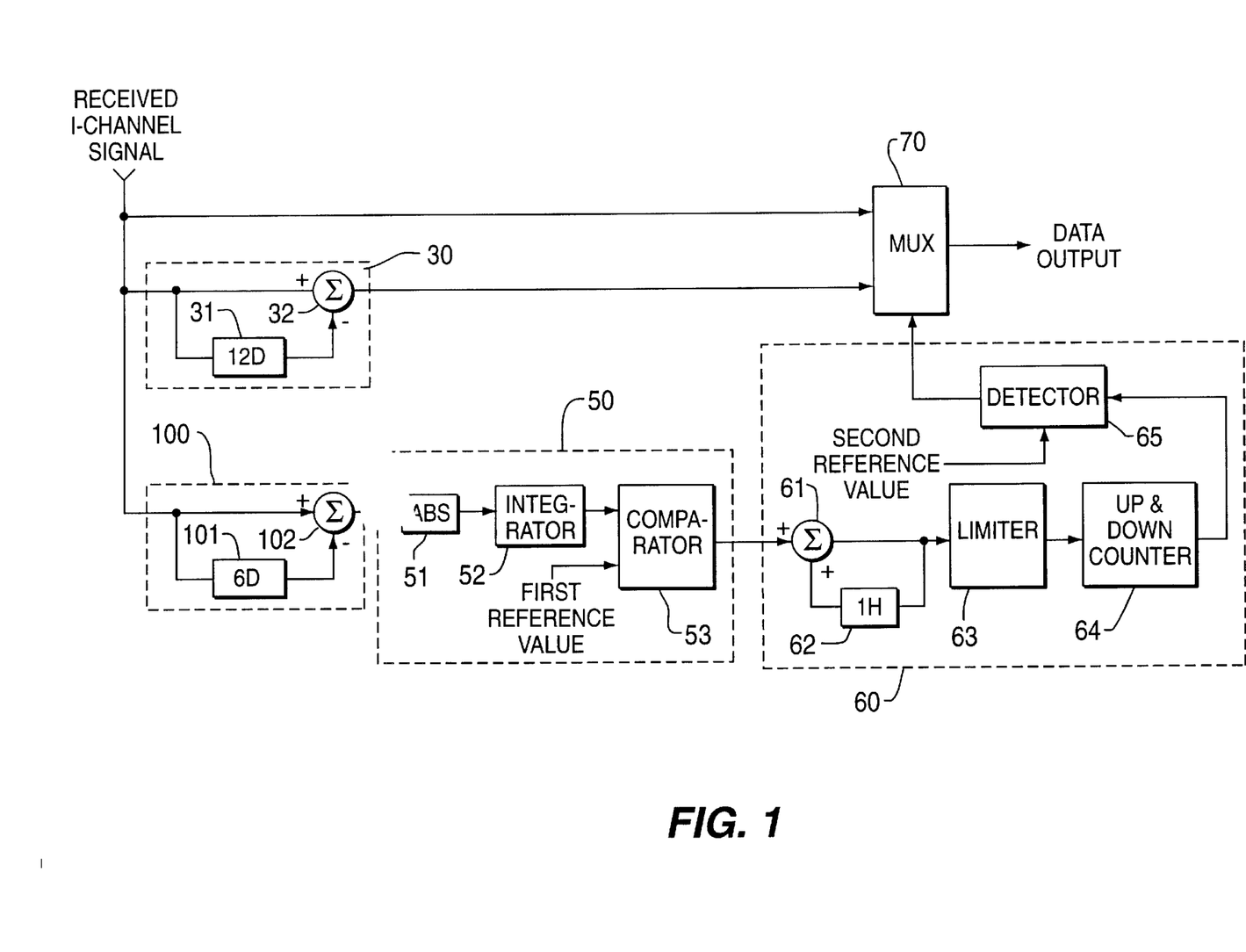
FIG. 1 is a block diagram of comb filter circuitry selectively employed for suppressing NTSC co-channel interference accompanying a digital television signal, selection being controlled by NTSC interference detector circuitry constructed in accordance with the invention disclosed in U.S. patent application Ser. No. 08/724,800 filed 2 Oct. 1996.

FIG. 1 shows comb filter circuitry selectively employed for suppressing NTSC co-channel interference, the elements of which circuitry correspond to the similarly numbered elements of drawing FIG. 5 of U.S. Pat. No. 5,546,132. The FIG. 1 circuitry differs from that shown in drawing FIG. 5 of U.S. Pat. No. 5,546,132, however, in that the NTSC extracting filter 40 is replaced by an NTSC extracting filter 100, generating a response to the received I-channel signal that is supplied to the comparing portion 50 as its input signal. The output connection of the comparing portion 50 to a control signal generator 60 is similar to that in drawing FIG. 5 of U.S. Pat. No. 5,546,132. The connections of an NTSC removing filter 30, a control signal generator 60 and a multiplexer 70 in the FIG. 2 post-coder selection circuitry are similar to those in drawing FIG. 5 of U.S. Pat. No. 5,546,132.

NTSC extracting filter 100 uses a delay circuit 101 for differentially delaying the received I-channel signal by six symbol periods, or epochs and a subtractor 102 for differentially combining the resulting differentially delayed I-channel signals. NTSC extracting filter 100 differs from the NTSC extracting filter 40 of U.S. Pat. No. 5,546,132 and from its FIG. 7 NTSC extracting filter in that the use of the subtractor 102 causes the NTSC extracting filter 100 to be non-responsive to the direct-bias component of the received I-channel signal. The six symbol epochs of delay provided by the delay circuit 101 causes the video carrier beats at 59.75 times data line frequency in the differentially delayed I-channel signals to be displaced from each other by about one-half cycle, so their differential combination by the subtractor 102 is constructive, rather than destructive in the difference output signal supplied by the subtractor 102 to the comparing portion 50 as its input signal in the FIG. 1 circuitry. The six symbol epochs of delay provided by the delay circuit 101 causes the chroma subcarrier beats at 287.25 times data line frequency in the differentially delayed I-channel signals to be displaced from each other by about two and one-half cycles, so their differential combination by the subtractor 102 is constructive, rather than destructive in the difference output signal supplied by the subtractor 102 to the comparing portion 50 as its input signal in the FIG. 1 circuitry.

Figure 2:
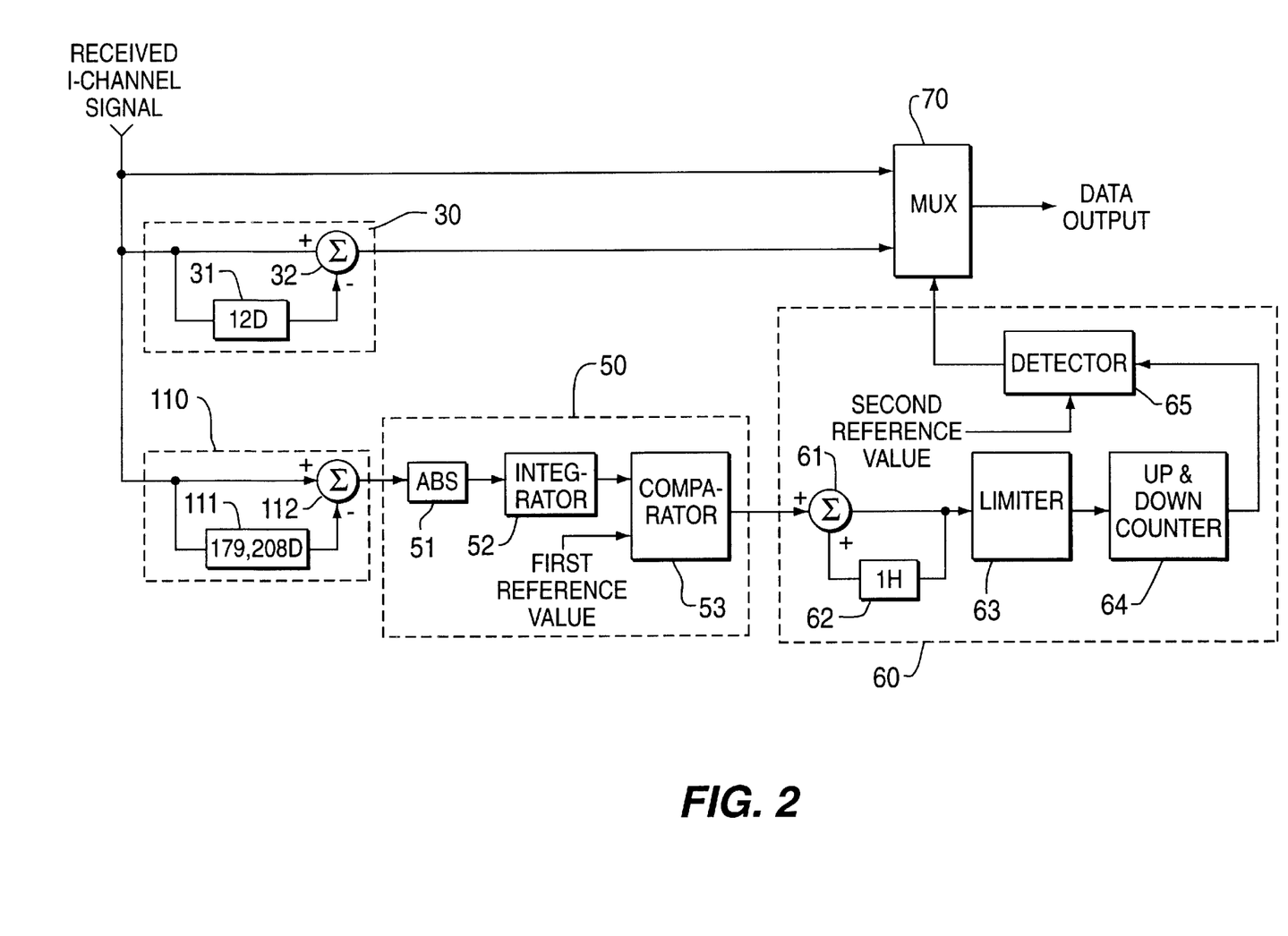
FIG. 2 is a block diagram of comb filter circuitry selectively employed for suppressing NTSC co-channel interference accompanying a digital television signal, selection being controlled by alternative NTSC interference detector circuitry constructed in accordance with an aspect of the invention first specifically disclosed herein.

FIG. 2 shows alternative circuitry for selectively employing comb filter circuitry to suppress NTSC co-channel interference, modifying the FIG. 1 post-coder selection circuitry to replace the NTSC extracting filter 100 with an NTSC extracting filter 110 in which data differentially delayed by 179,208 symbol epochs are subtractively combined. The 179,208 symbol epochs differential delay has a period substantially equal to 262 NTSC horizontal scan lines. The NTSC extracting filter 110 includes a 179,208-symbol delay 111, which corresponds with a 262-horizontal-scan-lines delay for NTSC video signal and can be not too expensively realized using dynamic random-access memory (DRAM) arranged for read-then-write-over operation. The NTSC extracting filter 110 further includes a digital subtractor 112, the use of which causes the NTSC extracting filter 110 to be non-responsive to the direct-bias component of the received I-channel signal. The 262-horizontal-scan-lines delay provided by the delay circuit 101 causes the video carrier beats at 59.75 times data line frequency to be substantially oppositely phased in the differentially delayed I-channel signals, so their differential combination by the subtractor 112 is constructive, rather than destructive in the difference output signal supplied by the subtractor 112 to the comparing portion 50 as its input signal in the FIG. 2 circuitry. The 262-horizontal-scan-lines delay provided by the delay circuit 101 causes the chroma subcarrier beats at 287.25 times data line frequency to be substantially oppositely phased in the differentially delayed I-channel signals, so their differential combination by the subtractor 112 is constructive, rather than destructive in the difference output signal supplied by the subtractor 112 to the comparing portion 50 as its input signal in the FIG. 2 circuitry. The 262-horizontal-scan-lines delay provided by the delay circuit 101 causes the sound carrier beats at 345.75 times data line frequency to be substantially oppositely phased in the differentially delayed I-channel signals, so their differential combination by the subtractor 112 tends to be constructive, rather than destructive in the difference output signal supplied by the subtractor 112 to the comparing portion 50 as its input signal in the FIG. 2 circuitry. The sound carrier is frequency modulated, of course, so the sound carrier beats may in fact not be phased so as to cancel in the difference signal supplied by the subtractor 112.

Figure 3:
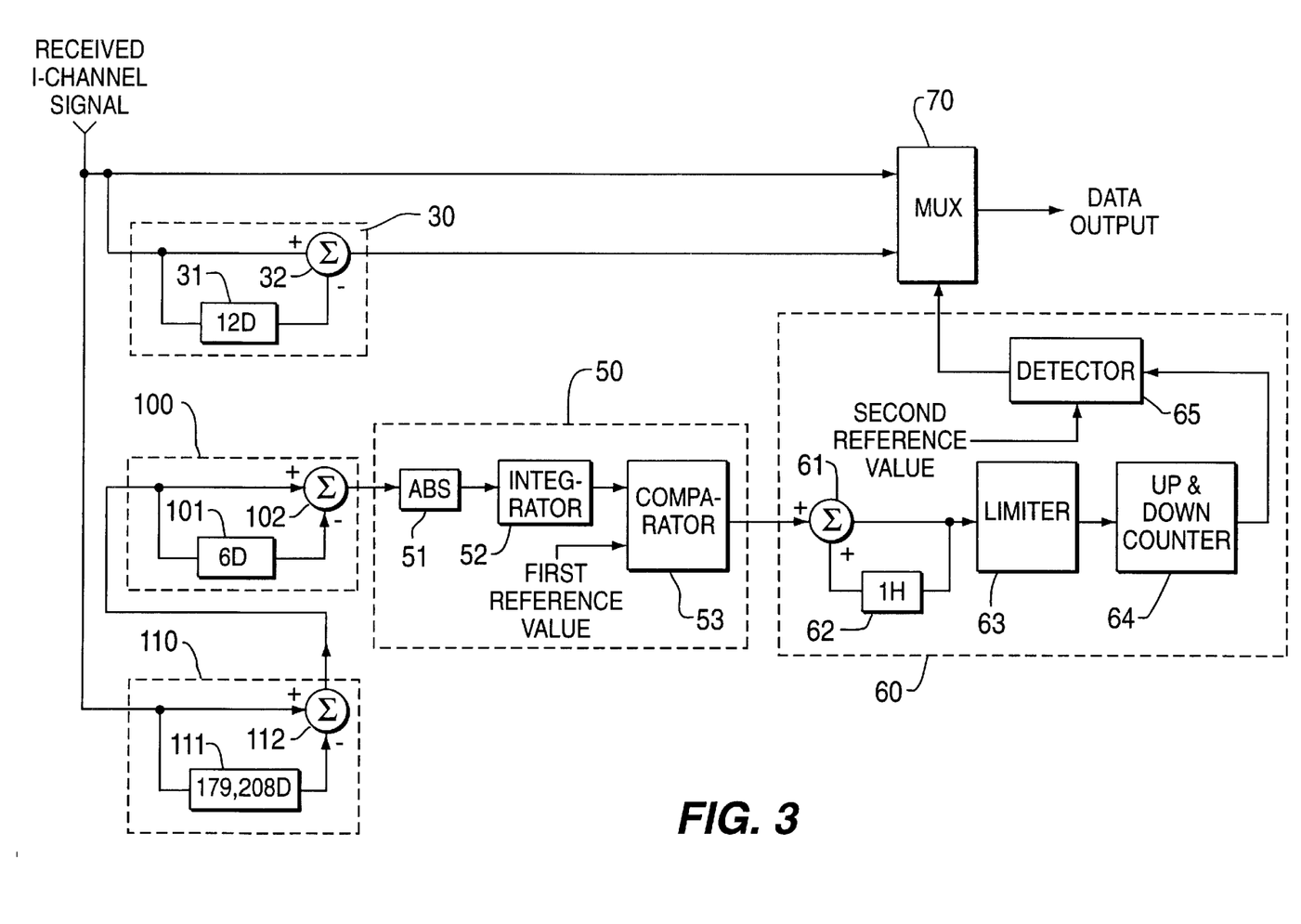
FIGS. 3 and 4 are block diagrams of comb filter circuitry selectively employed for suppressing NTSC co-channel interference accompanying a digital television signal, selection being controlled by still further NTSC interference detector circuitry constructed in accordance with aspects of the invention first specifically disclosed herein.

FIG. 3 shows a modification of the FIG. 2 circuitry in which the NTSC extracting filter 100 is preceded in cascade connection by the NTSC extracting filter 110.

Figures 4, 5:
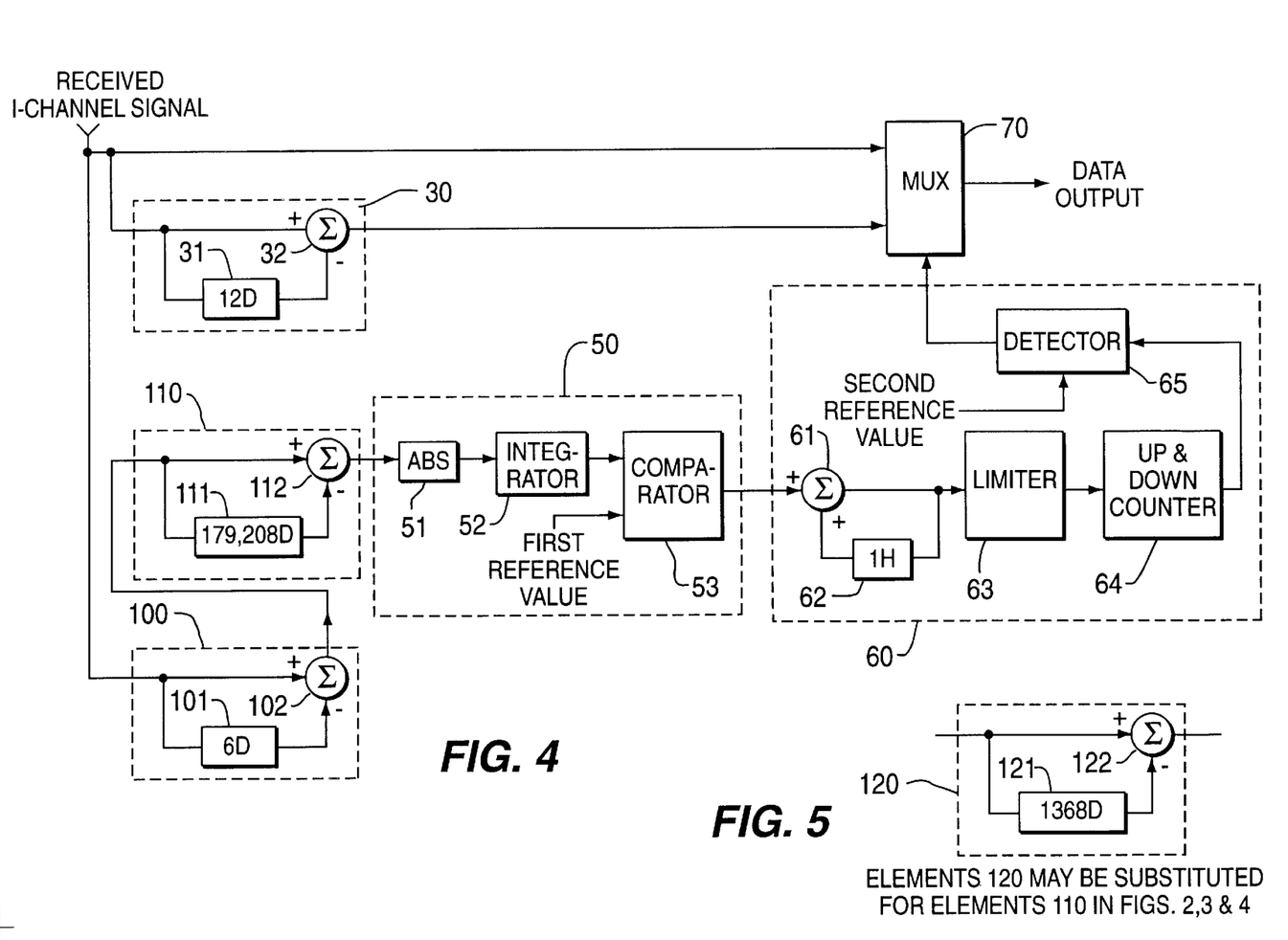
FIG. 5 is a block diagram of an NTSC extracting filter which in further embodiments of the invention first specifically disclosed herein replaces an NTSC extracting filter shown in FIGS. 2, 3 and 4.

FIG. 4 shows a modification of the FIG. 2 circuitry in which the NTSC extracting filter 100 is succeeded in cascade connection by the NTSC extracting filter 110.

The integrator 52 in the comparing portion 50 integrates during a substantial portion of each data scan line except those containing data field sync or occuring 179,208 symbol epochs later in the FIG. 2, FIG. 3 and FIG. 4 circuitry. This substantial portion can be the entire data line in the FIG. 2, FIG. 3 or FIG. 4 circuitry. In the FIG. 1 post-coder selection circuitry integration time should not be started until ten or more samples into the data line, thus to exclude the delayed line sync code sequence from the integration process. In the FIG. 1 circuitry the comparator 53 response is strobed to the control signal generator 60 during each line sync interval except any immediately preceding a data scan line containing data field sync, and then the integrator 52 is reset. In the FIG. 2, FIG. 3 or FIG. 4 circuitry the comparator 53 response is strobed to the control signal generator 60 during most line sync intervals, but not any line sync interval immediately preceding a data scan line containing data field sync nor any line sync interval preceding a data scan line a portion of which is differentially combined with a data scan line containing data field sync.

FIG. 5 shows an NTSC extracting filter 120 that can be substituted for the NTSC extracting filter 110 or cascaded therewith in still further embodiments of the invention. The NTSC-extracting comb filter 120 includes a 1,368-symbol delay 121, which corresponds with a 2-horizontal-scan-lines delay for NTSC video signal and can realized using dynamic random-access memory (DRAM) arranged for read-then-write-over operation. The NTSC extracting filter 120 further includes a digital subtractor 122, the use of which causes the NTSC extracting filter 120 to be non-responsive to the direct-bias component of the received I-channel signal. The 2-horizontal-scan-lines delay provided by the delay circuit 121 causes the video carrier beats at 59.75 times data line frequency to be substantially oppositely phased in the differentially delayed I-channel signals and also causes the chroma subcarrier beats at 287.25 times data line frequency to be substantially oppositely phased in the differentially delayed I-channel signal. So the differential combinations of these beats by the subtractor 122 is constructive, rather than destructive in the difference output signal supplied by the subtractor 122. The 2-horizontal-scan-lines delay provided by the delay circuit 121 causes the sound carrier beats at 345.75 times data line frequency to be substantially oppositely phased in the differentially delayed I-channel signals, so their differential combination by the subtractor 122 tends to be constructive, rather than destructive in the difference output signal supplied by the subtractor 122. The sound carrier is frequency modulated, of course, so the sound carrier beats may in fact not be phased so as to cancel in the difference signal supplied by the subtractor 122.

Circuitry using the NTSC extracting filter 110 in cascade with the FIG. 5 NTSC extracting filter 40 of U.S. Pat. No. 5,546,132 is a further construction in accordance with the invention. Circuitry using the NTSC extracting filter 120 in cascade with the FIG. 5 NTSC extracting filter 40 of U.S. Pat. No. 5,546,132 is a further construction in accordance with the invention.

What is claimed is:

1. An NTSC interference detector incorporated within a digital high-definition television receiver including a demodulator for extracting a received I-channel baseband signal susceptible of being accompanied at times by respective co-channel interfering NTSC signal components, said NTSC interference detector comprising:

an NTSC extracting filter for supplying an NTSC extracting filter response that separates accompanying co-channel interfering NTSC signal component from said received I-channel baseband signal and an accompanying direct bias signal, said NTSC extracting filter comprising a first comb filter, said first comb filter including a first delay circuit for supplying in response to said received I-channel baseband signal differentially delayed signals with a prescribed amount of differential delay equal to the duration of an even number of horizontal scanning periods of NTSC signal as will generate said co-channel interfering NTSC signal components, said comb filter further including a first subtractor for differentially combining said differentially delayed signals to generate the response of said first comb filter;

a comparing portion for periodically integrating said NTSC extracting filter response and deciding whether said co-channel interfering NTSC signal component separated from said received I-channel baseband signal is above a first reference value or not; and a control signal generator for accumulating the signal supplied from said comparing portion for each integration period, deciding the presence or absence of said co-channel interfering NTSC signal components according to a second reference value, and supplying a control signal according to the presence or absence of said co-channel interfering NTSC signal component in said received I-channel baseband signal.

2. An NTSC interference detector as claimed in claim 1, wherein said first delay circuit provides 179,208 symbol epochs, or the equivalent of 262 NTSC horizontal scanning periods, of differential delay.

3. An NTSC interference detector as claimed in claim 2; wherein said first delay circuit is connected for differentially delaying said received I-channel baseband signal; and wherein said first subtractor is connected for differentially combining the resulting differentially I-channel baseband signal to generate a first subtractor response used as the response of said NTSC extracting filter.

4. An NTSC interference detector as claimed in claim 1, wherein said NTSC extracting filter further comprises a second delay circuit for differentially delaying said received I-channel baseband signal for six symbol epochs and a second subtractor for differentially combining the resulting differentially delayed baseband I-channel signals to generate a second subtractor response; wherein said first delay circuit is connected for differentially delaying said second subtractor response for 179,208 symbol epochs, or the equivalent of 262 NTSC horizontal scanning periods; and wherein said first subtractor is connected for differentially combining the resulting differentially delayed second subtractor responses to generate a first subtractor response used as the response of said NTSC extracting filter.

5. An NTSC interference detector as claimed in claim 1, wherein said first delay circuit is connected for differentially delaying said received I-channel baseband signal for 179, 208 symbol epochs, or the equivalent of 262 NTSC horizontal scanning periods, and said first subtractor is connected for differentially combining the resulting differentially delayed baseband I-channel signals to generate a first subtractor response; and wherein said NTSC extracting filter further comprises:

a second delay circuit for differentially delaying said first subtractor response for six symbol epochs; and a second subtractor for differentially combining the resulting differentially delayed first subtractor responses to generate a second subtractor response used as the response of said NTSC extracting filter.

6. An NTSC interference detector as claimed in claim 1, wherein said first delay circuit provides 1,368 symbol epochs, or the equivalent of two NTSC horizontal scanning periods, of differential delay.

7. An NTSC interference detector as claimed in claim 6; wherein said first delay circuit is connected for differentially delaying said received I-channel baseband signal; and wherein said first subtractor is connected for differentially combining the resulting differentially I-channel baseband signal to generate a first subtractor response used as the response of said NTSC extracting filter.

8. An NTSC interference detector as claimed in claim 1, wherein said NTSC extracting filter further comprises a second delay circuit for differentially delaying said received I-channel baseband signal for six symbol epochs and a second subtractor for differentially combining the resulting differentially delayed baseband I-channel signals to generate a second subtractor response; wherein said first delay circuit is connected for differentially delaying said second subtractor response for 1,368 symbol epochs, or the equivalent of two NTSC horizontal scanning periods; and wherein said first subtractor is connected for differentially combining the resulting differentially delayed second subtractor responses to generate a first subtractor response used as the response of said NTSC extracting filter.

9. An NTSC interference detector as claimed in claim 1, wherein said first delay circuit is connected for differentially delaying said received I-channel baseband signal for 1,368 symbol epochs, or the equivalent of two NTSC horizontal scanning periods, and said first subtractor is connected for differentially combining the resulting differentially delayed baseband I-channel signals to generate a first subtractor response; and wherein said NTSC extracting filter further comprises:

a second delay circuit for differentially delaying said first subtractor response for six symbol epochs; and a second subtractor for differentially combining the resulting differentially delayed first subtractor responses to generate a second subtractor response used as the response of said NTSC extracting filter.

10. Selectively activated comb-filtering circuitry incorporated within a digital high-definition television receiver including a demodulator for extracting a received I-channel baseband signal susceptible of being accompanied at times by respective co-channel interfering NTSC signal components, said selectively activated comb-filtering circuitry comprising:

an NTSC extracting filter for supplying an NTSC extracting filter response that separates accompanying co-channel interfering NTSC signal component from said received I-channel baseband signal including a direct bias component thereof, said NTSC extracting filter comprising a first comb filter, said first comb filter including a first delay circuit for supplying in response to said received I-channel baseband signal differentially delayed signals with a prescribed amount of differential delay equal to the duration of an even number of horizontal scanning periods of NTSC signal as will generate said co-channel interfering NTSC signal components, said comb filter further including a first subtractor for differentially combining said differentially delayed signals to generate the response of said first comb filter;

a comparing portion for periodically integrating said NTSC extracting filter response and deciding whether said co-channel interfering NTSC signal component from said I-channel baseband signal is above a first reference value or not;

a control signal generator for accumulating the signal supplied from said comparing portion for each integration period, deciding the presence or absence of said co-channel interfering NTSC signal components according to a second reference value, and supplying a control signal having a first condition or a second condition according to the presence or absence respectively of said co-channel interfering NTSC signal component in said received I-channel baseband signal; and a comb filter for said received I-channel signal enabled in response to the first condition of said control signal and disabled in response to the second condition of said control signal.

11. An NTSC interference detector as claimed in claim 10, wherein said first delay circuit provides 179,208 symbol epochs, or the equivalent of 262 NTSC horizontal scanning periods, of differential delay.

12. An NTSC interference detector as claimed in claim 10; wherein said first delay circuit is connected for differentially delaying said received I-channel baseband signal; and wherein said first subtractor is connected for differentially combining the resulting differentially I-channel baseband signal to generate a first subtractor response used as the response of said NTSC extracting filter.

13. An NTSC interference detector as claimed in claim 10, wherein said NTSC extracting filter further comprises a second delay circuit for differentially delaying said received I-channel baseband signal for six symbol epochs and a second subtractor for differentially combining the resulting differentially delayed baseband I-channel signals to generate a second subtractor response; wherein said first delay circuit is connected for differentially delaying said second subtractor response for 179,208 symbol epochs, or the equivalent of 262 NTSC horizontal scanning periods; and wherein said first subtractor is connected for differentially combining the resulting differentially delayed second subtractor responses to generate a first subtractor response used as the response of said NTSC extracting filter.

14. An NTSC interference detector as claimed in claim 10, wherein said first delay circuit is connected for differentially delaying said received I-channel baseband signal for 179,208 symbol epochs, or the equivalent of 262 NTSC horizontal scanning periods, and said first subtractor is connected for differentially combining the resulting differentially delayed baseband I-channel signals to generate a first subtractor response; and wherein said NTSC extracting filter further comprises:

a second delay circuit for differentially delaying said first subtractor response for six symbol epochs; and a second subtractor for differentially combining the resulting differentially delayed first subtractor responses to generate a second subtractor response used as the response of said NTSC extracting filter.

15. An NTSC interference detector as claimed in claim 10, wherein said first delay circuit provides 1,368 symbol epochs, or the equivalent of two NTSC horizontal scanning periods, of differential delay.

16. An NTSC interference detector as claimed in claim 15; wherein said first delay circuit is connected for differentially delaying said received I-channel baseband signal; and wherein said first subtractor is connected for differentially combining the resulting differentially I-channel baseband signal to generate a first subtractor response used as the response of said NTSC extracting filter.

17. An NTSC interference detector as claimed in claim 10, wherein said NTSC extracting filter further comprises a second delay circuit for differentially delaying said received I-channel baseband signal for six symbol epochs and a second subtractor for differentially combining the resulting differentially delayed baseband I-channel signals to generate a second subtractor response; wherein said first delay circuit is connected for differentially delaying said second subtractor response for 1,368 symbol epochs, or the equivalent of two NTSC horizontal scanning periods; and wherein said first subtractor is connected for differentially combining the resulting differentially delayed second subtractor responses to generate a first subtractor response used as the response of said NTSC extracting filter.

18. An NTSC interference detector as claimed in claim 10, wherein said first delay circuit is connected for differentially delaying said received I-channel baseband signal for 1,368 symbol epochs, or the equivalent of two NTSC horizontal scanning periods, and said first subtractor is connected for differentially combining the resulting differentially delayed baseband I-channel signals to generate a first subtractor response; and wherein said NTSC extracting filter further comprises:

a second delay circuit for differentially delaying said first subtractor response for six symbol epochs; and a second subtractor for differentially combining the resulting differentially delayed first subtractor responses to generate a second subtractor response used as the response of said NTSC extracting filter.

* * * * *